United States Patent
Jahn et al.

(10) Patent No.: US 7,123,806 B2
(45) Date of Patent: Oct. 17, 2006

(54) INTELLIGENT OPTICAL NETWORK ELEMENT

(75) Inventors: Elke Jahn, Höchberg (DE); Niraj Agrawal, Höchberg (DE)

(73) Assignee: Molex Holding GmbH, (DE)

( * ) Notice: Subject to any disclaimer, the term of this patent is extended or adjusted under 35 U.S.C. 154(b) by 148 days.

(21) Appl. No.: 10/401,176

(22) Filed: Mar. 27, 2003

(65) Prior Publication Data

US 2003/0215232 A1 Nov. 20, 2003

(30) Foreign Application Priority Data

Mar. 27, 2002 (EP) .................................. 02007008

(51) Int. Cl.
*G02B 6/00* (2006.01)
*H04B 10/00* (2006.01)

(52) U.S. Cl. ........................................ 385/134; 398/41
(58) Field of Classification Search ................. 385/16, 385/17, 134; 398/41
See application file for complete search history.

(56) References Cited

U.S. PATENT DOCUMENTS 6,163,595 A * 12/2000 Parker et al. ................. 379/22

FOREIGN PATENT DOCUMENTS

| EP | 0 594 198 | 4/1994 |
|---|---|---|
| EP | 0 644 704 | 3/1995 |
| EP | 0 802 697 | 7/2000 |
| EP | 1 322 057 | 6/2003 |
| WO | WO 99/44317 | * 9/1999 |
| WO | WO 00/34972 | * 6/2000 |
| WO | WO 01/16558 | 3/2001 |

* cited by examiner

*Primary Examiner*—Frank G. Font
*Assistant Examiner*—Eric Wong
(74) *Attorney, Agent, or Firm*—Fitch, Even, Tabin & Flannery

(57) ABSTRACT

The invention relates to an intelligent network element for optical networks, comprising:
  at least one back-plane with a plurality of electrical transmission lines running across the back-plane and a plurality of electrical terminals connected to the transmission lines;
  a plurality of line-card slices having electrical terminals, each line-card slice being attached to the back-plane directly or in the form of a plug-in module such, that the electrical terminals of the line-card slice are electrically connected to selected ones of the terminals of the back-plane, with
  at least one of the line-card slices comprising at least one optical receiver for receiving of optical signals from the network and at least one opto-electrical converter integrated in or optically connected to the optical receiver with electrical terminals, and
  at least one of the line-card slices comprising at least one optical transmitter for transmitting of optical signals to the network and at least one electro-optical converter integrated in or optically connected to the optical transmitter with electrical terminals;
  various or all of the said electrical terminals are implemented in form of switch terminals that provide selected and reconfigurable electrical interconnections among various of the at least one receiver, transmitter and/or converter.

23 Claims, 13 Drawing Sheets

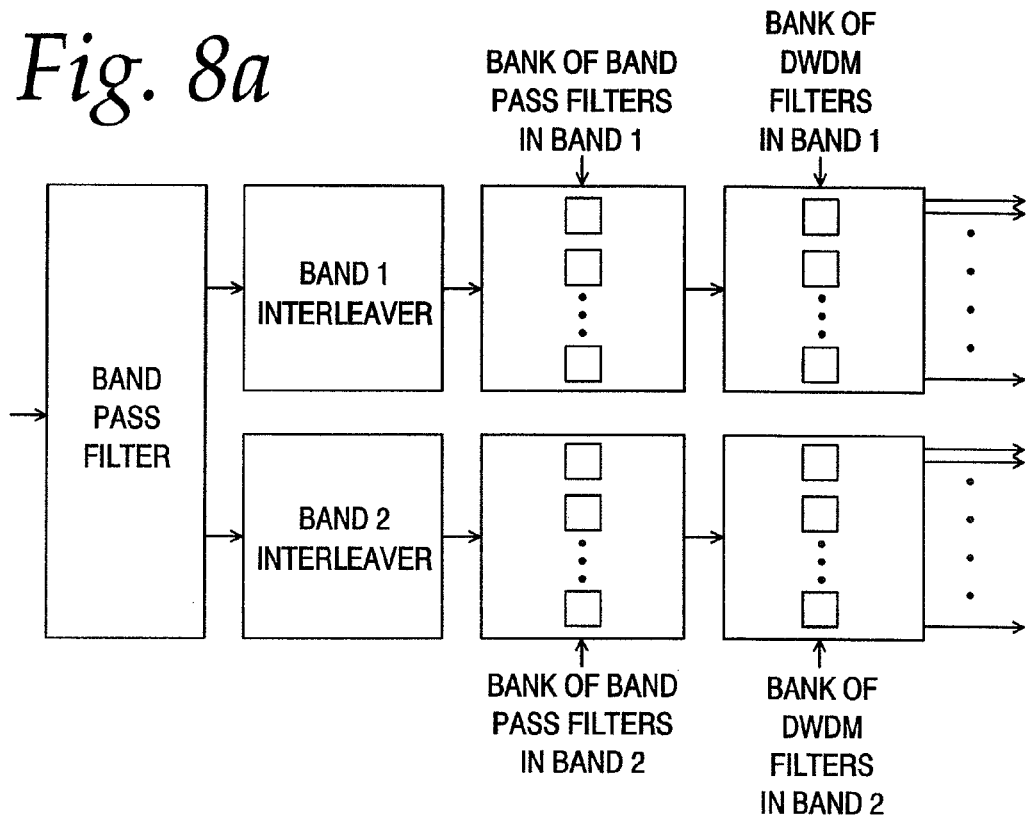
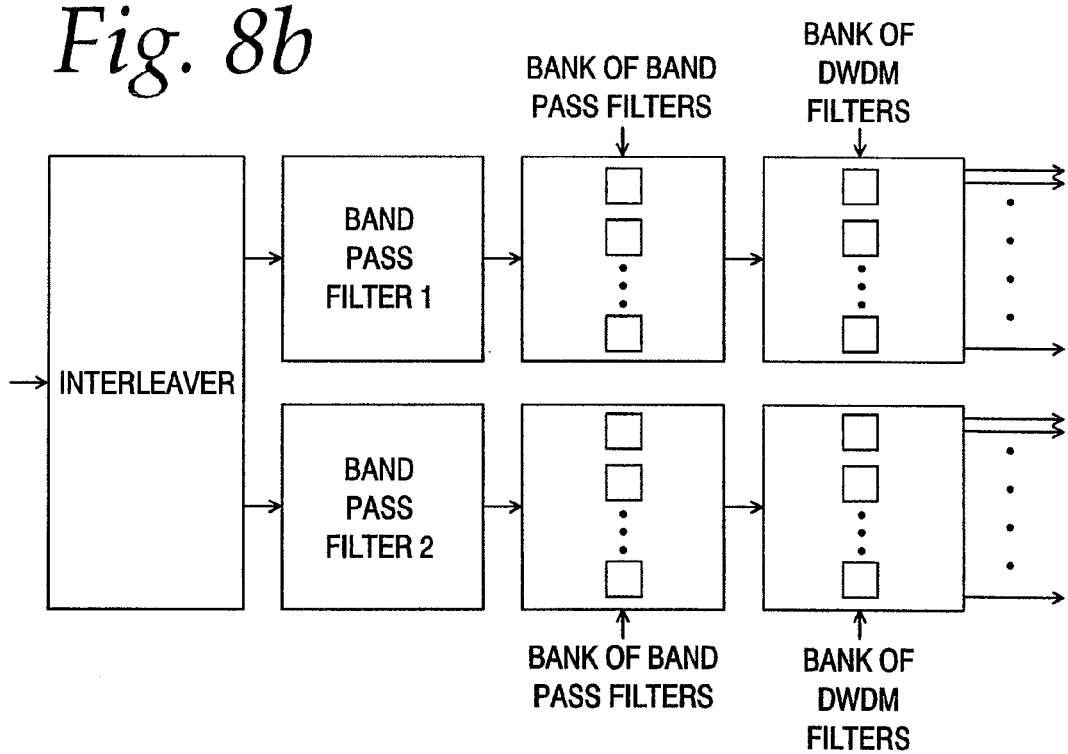

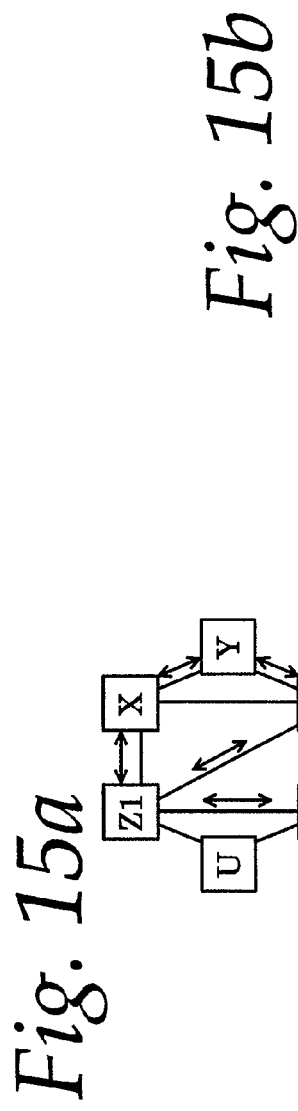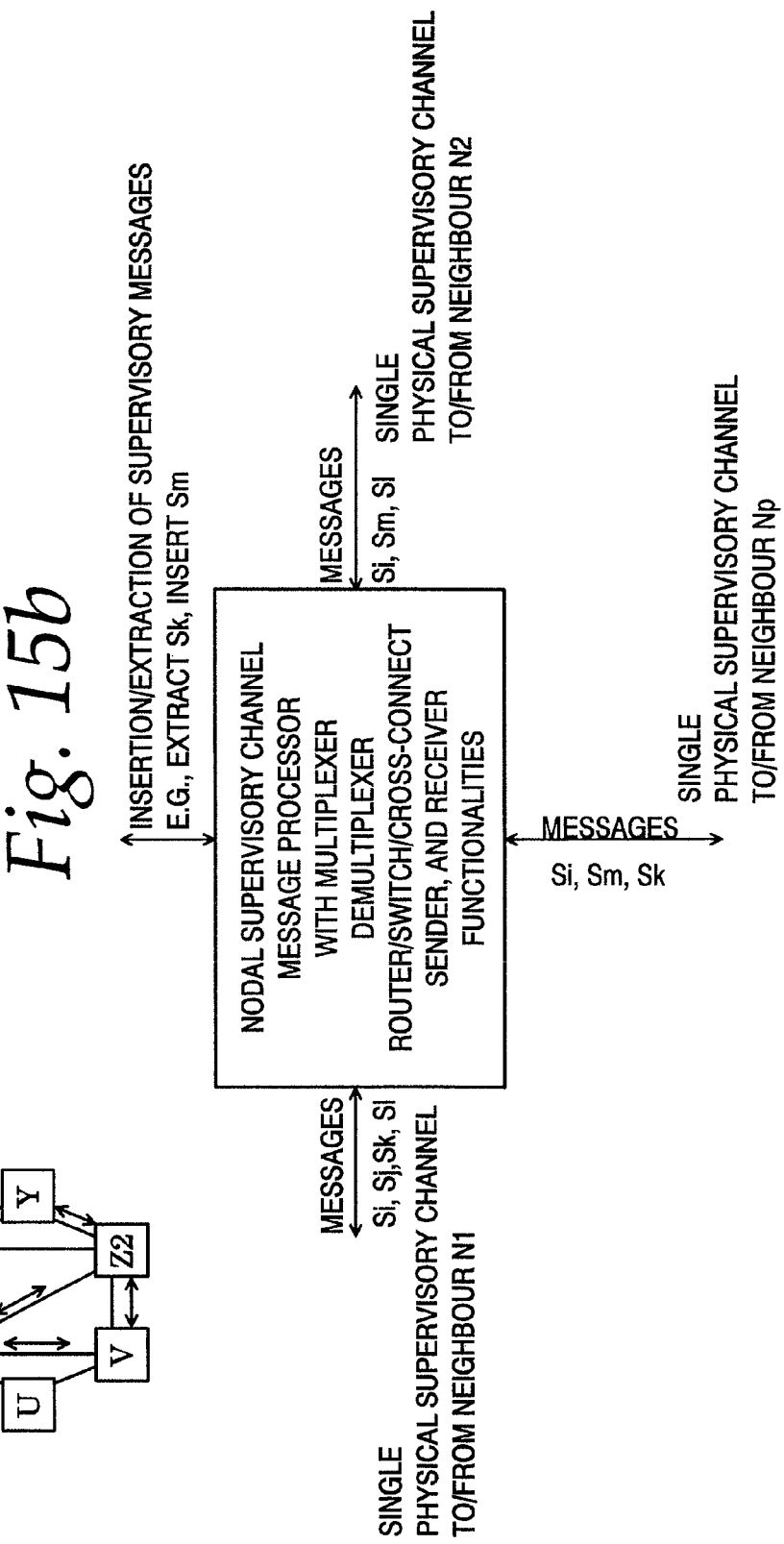

INTELLIGENT OPTICAL NETWORK ELEMENT

The present invention belongs to the field of optical communications, and in particular relates to an intelligent reconfigurable network element for use in an optical network with arbitrary topology, e.g., point-to-point, ring, mesh, etc.

The soaring demand for virtual private networks, storage area networking, and other new high speed services are driving bandwidth requirements that test the limits of today's optical communications systems. In an optical network, a node is physically linked to another using one or more optical fibres (cf. FIGS. 1 and 2). Each of the fibres can carry as many as one hundred or more communication channels, i.e., wavelengths in WDM (Wave Division Multiplex) or Dense WDM (DWDM) systems. Thus, for example, for a node with three neighbours as many as three hundred or more wavelength signals originate or terminate or pass through a given node. Each of the wavelengths may carry signals with data rates up to 10 Gbit/s or even higher. Thus each fibre is carrying several terabits of information. This is a tremendous amount of bandwidth and information that must be managed automatically, reliably, rapidly, and efficiently. It is evident that large amount of bandwidth needs to be provisioned. Fast and automatic provisioning enables network bandwidth to be managed on demand in a flexible, dynamic, and efficient manner. Another very important feature of such DWDM networks is reliability or survivability in presence of a failure such as an inadvertent fibre-cut, various types of hardware and software faults, etc. In such networks, in case of a failure, the user data is automatically rerouted to its destination via an alternate or restoration path. For example, for the mesh network shown in FIG. 2, the primary and restoration paths are as follows:

TABLE 1

| Demand ID | End Nodes | Protocol | Primary Path | Restoration Path |
|---|---|---|---|---|
| D1 | [#1, #5] | A | #1 <-> #2 <-> #5 | #1 <-> #4 <-> #5 |
| D2 | [#1, #3] | C | #1 <-> #2 <-> #3 | #1 <-> #4 <-> #3 |

Note that if the primary paths of demands D1 or D2 fail due to the failure of link #2-#5 or link #2-#3, a single wavelength channel over link #1-#4 could be used to restore both demand-ids D1 and D2. This is due to the fact that under single point of failure assumption, either link #2-#5 or link #2-#3 fails but not both at the same time. Thus as opposed to 1+1 where a 100% overcapacity is required for survivability, the same extra capacity can be shared between different demands for restoration. This results in significant savings in overall extra capacity required to realize survivable DWDM systems.

There have been proposals to create such mesh networks using cross-connects, which in case of core networks with several neighbours and large wavelength count, require gigantic switch matrices or cross-connects and several O/E and E/O conversions making the cost of such a system prohibitively expensive. While a handful of the national and international carriers are able to afford such expensive systems, such systems are outside the budget of small and local carriers and enterprises, which operate the so-called metro, or enterprise networks. Such networks require relatively smaller number of wavelengths but tend to be more "meshy" than core networks. Thus it follows that there is a tremendous need for DWDM systems, which are highly modular and low-cost and which can be scaled both upwards and downwards in capacity and cost for smaller customers. The situation is analogous to the case of the personal computer and mainframes, where the customer wants and needs some of the key features of a complex and large system but needs and can afford to pay for only a small (in terms of hardware) system. Automatic provisioning and restoration is highly desirable but at present is unaffordable for metro or enterprise networks. In such a network a complete protection/restoration of the network under single point of failure is provided.

Up to now, to increase capacity, carriers implement protocol dependent architectures and switches/cross-connects, e.g. SONET(Synchronous Optical Network)/SDH (Synchronous Digital Hierarchy) multiplexing with its ring architecture, ATM (Asynchronous Transfer Mode) and fibre-channel switches, etc.

Such networks, which provide protection against multiple types of failures including the fibre cut, are expensive and work only for ring architecture and specific protocols.

EP-A-0 644 704 shows a point-to-multipoint optical transmission system with various optical receivers and transmitters that are interconnected by optical fibers and switched by optical switches. WO 00/34972 A shows a reconfigurable multiwavelength network with a very complex structure including various multiplexer and demultiplexer. EP-A-0 594 198 shows a crossbar switch for synthesizing multiple backplane interconnect topologies in a communication system. WO 01/16558 A describes a dense wavelength division multiplexer. The purpose of the present invention is to provide a reconfigurable network element, which allows building up and adapting of an optical network system according to the demands of an individual carrier thereby providing high flexibility and low costs. With the reconfigurable network element it should be possible to scale up or down a network system to individually needed functionality without depending on specific architectures and specific protocols. Furthermore the network element should be cheap in production and installation to facilitate widespread deployment This purpose is realized by an intelligent network element according to claim 1. The dependent claims describe preferred embodiments.

The intelligent network element according to the present invention comprises at least one back-plane with a plurality of electrical transmission lines, which run across the back-plane. Furthermore, the back-plane comprises a plurality of electrical terminals, which are connected to the transmission lines for attaching of electrical devices such as various cards and/or circuit packs with determined circuitry that should be interconnected by the back-plane.

The network element according to the present invention further comprises at least one of a first line-card slice with at least one receiver for receiving of optical signals from a predetermined path of the optical network in which the network element is integrated. The network element furthermore comprises at least one of a second line-card slice with at least one transmitter for transmitting of optical signals to a predetermined path of the optical network. The line-card slices can be local line-card slices or remote line-card slices, for example the said first line-card slice could be a local line-card slice and the said second line-card slice could be a remote line-card slice. However, it is also possible to provide to local or remote line-card slices, one for receiving and one for transmitting of optical signals from respective to the optical network, or both for receiving and transmitting of optical signals. The terms "local" and "remote" are used herein to distinguish between two line-card slices, which provide transmit/receive interfaces to local user equipment in a central office or data centre and the user equipment located at a remote node.

Each line-card slice with a receiver comprises an opto-electrical converter for converting the received optical signals to electrical signals. The opto-electrical converter could be integrated in the receiver (so-called opto-electrical receiver) or attached as an independent device to the receiver. The at least one electrical terminal of the opto-electrical converter is attached to one or more electrical terminals of the at least one of the electrical terminals of the line-card slice.

Each line-card slice, which comprises a transmitter, is provided with an electro-optical converter, which could be integrated in the transmitter (so-called electro-optical transmitter) or attached as an independent device to the transmitter. The electrical terminal of the electro-optical converter is connected to one or more of the at least one of the electrical terminals of the line-card slice.

The line-card slices are plugged—directly or indirectly, with the latter preferably by means of a chassis—into the back-plane such that the electrical terminals of the line-card slices are connected to the electrical terminals of the back-plane and thereby the electrical terminals of various line-card slices are interconnected, thus allowing them to communicate with each other, via the electrical transmission lines in the back-plane.

The network element according to the invention comprises a plurality of switch terminals, which are provided between the converters of various line-card slices and/or between various converters on a single line-card slice. The switch terminals allow providing predetermined but reconfigurable electrical interconnections between various optical receivers and transmitters in the network element. The switch terminals may be provided on the back-plane, however, it is preferred to provide them on the line-card slices such that one or more of the electrical terminals of a converter on a line-card slice could be electrically connected to a predetermined electrical terminal or set of terminals of the line-card slice or to one or more of the electrical terminals of one or more further converters on the same line-card slice. Therefore, the switch terminals could be implemented by using electrical switches, for example, or as described in the following preferably by using one or more of electrical cross-connects.

Preferably, the switch terminals allow reconfigurable interconnections among various electrical terminals by using software or software commands, this means intelligence offered by software can be used to determine in real-time as to which terminals are interconnected in order to react dynamically to the various possible network states.

For switching of signals from a first path to a second path—for example primary path to restoration path—the network element preferably comprises at least one electrical cross-connect having first electrical terminals for receiving and/or input of electrical signals and second electrical terminals for transmitting and/or output of electrical signals. The electrical cross-connect directs electrical signals from selected first to selected second electrical terminals, thereby determining the way of the signals through the network. The electrical cross-connect is plugged into the back-plane—directly or indirectly—whereby the electrical terminals of the cross-connect are connected to the electrical terminals of the back-plane so that the first electrical terminals are interconnected via the electrical transmission lines of the back-plane to electrical terminals of selected first line-card slices (with at least one receiver) and the second electrical terminals of the cross-connect are interconnected via the electrical transmission lines to electrical terminals of selected second line-card slices (with at least one transmitter).

To keep the electrical connections between the line-card slices and the cross-connect short in order to achieve low signal attenuation the line-card slices and the at least one cross-connect are preferably distributed on the back-plane in such a way that each cross-connect is electrically sandwiched between a predetermined number of line-card slices with at least one receiver and line-card slices with at least one transmitter. By this arrangement the electrical signals from a first line-card slice, e.g. a local line-card slice, are transmitted over very short transmission lines to the cross connect and then further from the cross-connect over very short transmission lines to the second line-card slice, e.g. a remote line-card slice. The various line-card slices and electrical cross-connects can be attached to the back-plane for example either directly or as plug in modules.

Especially in bi-directional network architectures each line-card slice comprises preferably both of one optical transmitter and one optical receiver together with the corresponding converters. In bi-directional network architectures each node is connected to another node by at least two separate lines for signal traffic with signals travelling in opposite directions. The signals reaching one node are received and converted by the receiver and the signals leaving the node are preferably converted and transmitted by the optical transmitter of each line-card slice, respectively.

For use of the network element in a DWDM network system the network element comprises preferably at least one filter-unit for transforming of the optical multi-wavelength signals into individual wavelength channel signals. The filter-unit is arranged in an optical path before (with respect to the flow of optical signals) an optical receiver of a line-card slice or behind an optical transmitter of a line-card slice. The filter-unit is preferably implemented in one or more filter-cards, which are pluggable—directly, or indirectly, the latter preferably by means of a chassis—into the back-plane. By use of the transmission lines running across the back-plane and the corresponding electrical terminals the filter-units or cards could be electrically managed and controlled via the back-plane or by means of electrical devices attached to the back-plane.

The filter-unit advantageously comprises a modular structure with various stages, whereby each stage comprises of at least one of a band-pass filter, an interleaver and a DWDM filter. By using a modular structure a very high flexibility and low costs for producing and integrating of the filter-units in the network element could be reached. The modular structure of the filter-units will be described in more detail later in this document.

For providing of very high data rates the network element comprises preferably a single back-plane for providing of the electrical connections between the different devices such as line-card slices, electrical cross-connects, filter cards etc. Furthermore, by combining of DWDM line-card slices, filters, and optical cross-connect functionality in a single hardware unit of the network element, highly flexible and reliable optical network architectures can be realized that can support arbitrary data protocols. The hardware in such networks combined with sophisticated software intelligence can be used to support advanced features such as dynamic provisioning/bandwidth trading, remote performance monitoring, and fast automatic restoration, etc. Intelligent optical switches and cross-connects can be used to support virtually any network topology including point-to-point, ring, and mesh architectures, allowing service providers, to evolve their existing infrastructures while immediately cutting both capital and operating costs. Whereas survivable ring architectures mandate the reservation of 100% excess capacity, mesh architectures leave the choice of protection to the service providers themselves, reducing costs by as much as 70% with acceptable critical restoration times. The present invention allows the operator to achieve varying levels of flexibility and survivability in optical networks and trade off costs with desired features and vice versa.

The network element according to the present invention supports one or more uni-directional optical fibre links between a pair of nodes without any restriction to the total number of the nodes in the network or to the number of nearest neighbours which a given node can have. Each uni-directional or bi-directional optical fibre links supports multi-wavelength signals. In one preferred embodiment the maximum number of wavelengths in the aforementioned multi-wavelength signals is seventy two.

The components of a given network element according to the present invention are bit-rate and protocol transparent. This implies that the network element is configurable to various bit-rates and data networking protocols under the intelligence provided by hardware and software programming under static or dynamic/real-time operation conditions. The network element could be used to built optical networks with arbitrary topology to provide automatic or point-and-click provisioning, fault protection/restoration, and other services such as band-with-trading, etc. with a centralized distributed, or hybrid form of network management system, which comprises various software modules as described later in this document.

The present invention would be now described in conjunction with the accompanying drawings, which are included to provide a further understanding of the invention and its background.

In the drawings:

FIG. 8 shows various stages of a demultiplexer of a preferred embodiment of a filter-unit;

FIG. 15 shows the connection of supervisory channels between various network elements;

Figure 1:
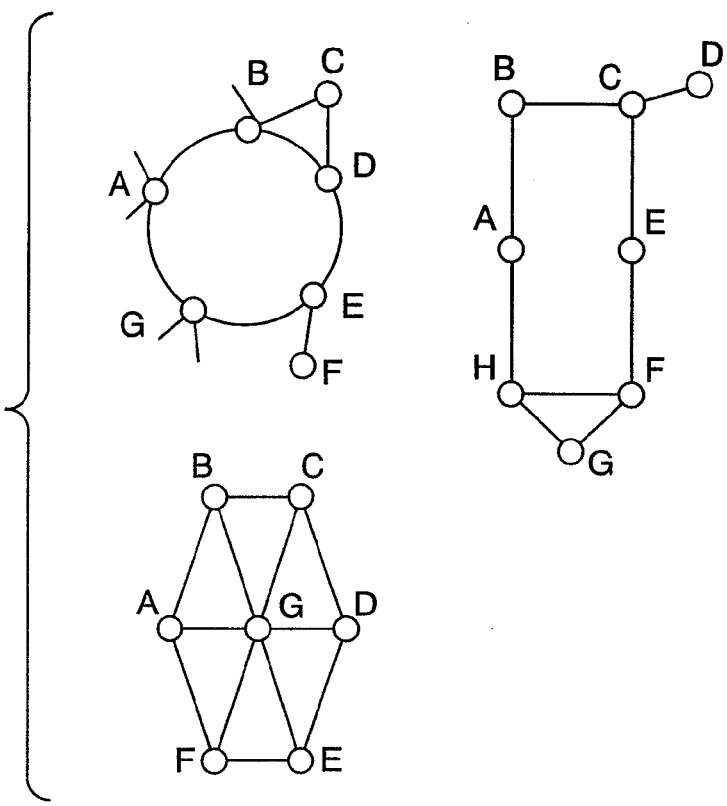
FIG. 1 is a diagram showing examples of network architectures in which the network element according to the present invention could be used.

In FIG. 1 are shown different network architectures in which the network element according to the present invention could be used. Due to the modular flexible structure of the network element it could be used in arbitrary network architectures, like ring, point-to-point, mesh networks and mixtures thereof.

Figure 2:
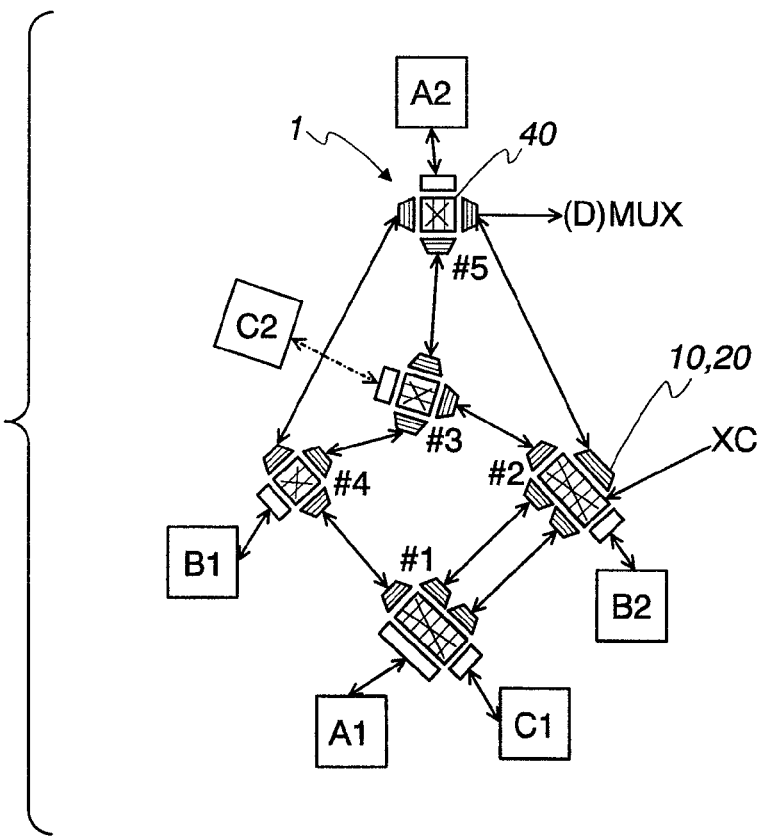
FIG. 2 is a diagram, which shows the use of cross-connect functionality of the network element in a DWDM network.

The cross-connect functionality of a network element according to the present invention with an additional electrical cross-connect is shown in FIG. 2. Five nodes are shown (#1–#5), each of which with a network element according to the present invention. The architecture is data protocol independent (or transparent) and utilizes a common hardware and software platform. In this example there are one or more optical fibre links between a pair of nodes. The links can be either uni-directional (single fibre) or bi-directional (two fibres with one fibre for each direction). For example, two bi-directional links between nodes #1 and #2 are shown in FIG. 2. Between the five nodes are shown eight bi-directional links.

The users can communicate between any pair of nodes by using an arbitrary data protocol and data terminal equipment (e.g. A, B. C, etc.). The data protocol may require setting up of a uni-directional or bi-directional path between a pair of nodes. Examples of data protocols include ESCON, FICON, fibre channel, gigabit Ethernet, SDH/SONET, ATM, packet over SDH/SONET, etc. For instance, the users communicate between nodes #1 and #5 and between nodes #1 and #3 using protocols A and C, with demand ids D1 and D2, respectively (cf. Table 1). As opposed to ring architecture where each node has only two neighbours, in mesh networks each node can have arbitrary number of neighbours. For example, each of the nodes #2, #3, #4 and #5 in FIG. 2 has three neighbours.

Figure 3:
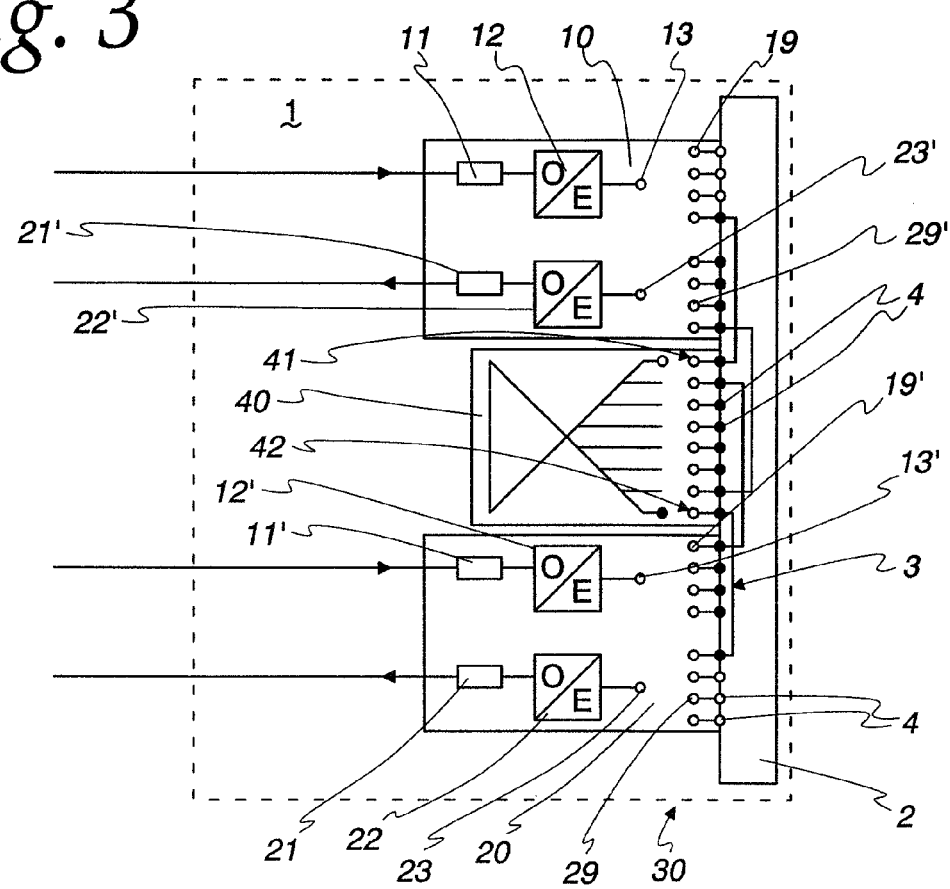
FIG. 3 shows a preferred embodiment with two line-card slices and one cross-connect.

In FIG. 3 is shown an embodiment of a network element 1 with two line-card slices 10, 20, plugged into a back-plane 2. Each line-card slice—local line-card slice 10 and remote line-card slice 20—comprises a number of electrical terminals 19, 29 that are connected to the electrical terminals 4 of the back-plane 2. The line-card slice 10 comprises a receiver 11 for receiving of optical signals from the network system. Attached to the receiver 11 is an opto-electrical converter 12 for converting of the optical signals to electrical signals. The electrical terminal 13 of the opto-electrical converter 12 is implemented as a switch terminal 30 that could be switched, i.e. electrically connected by software or hardware, to one of the electrical terminals 19 of the line-card slice 10.

The line-card slice 20 comprises a transmitter 21 for transmitting of optical signals to the network system and attached to the transmitter 21 is an electro-optical converter 22, which receives electrical signals from the back-plane 4 via the electrical terminals 29 of the line-card slice 20 and the electrical terminal 23. The electrical terminal 23 of the converter 22 is implemented as a switch terminal 30 which could be switched, i.e. electrically connected by software or hardware, to a selected one of the terminals 29 of the line-card slice 20. The converter 22 converts the received electrical signals to optical signals and communicates the same to the transmitter 21.

Between the line-card slices 10 and 20 there is disposed an electrical cross-connect 40 electrically sandwiched. This means the electrical terminals of the line-card slice 10 are connected to first electrical terminals 41 of the cross-connect 40 and the second electrical terminals 42 of the cross-connect 40 are connected to the electrical terminals 29 of the line-card slice 20. As shown in FIG. 3 there is a single electrical terminal of the line-card slice 10 connected to a single first electrical terminal of the cross-connect 40 and a single second electrical terminal of the cross-connect 40 is connected to a single electrical terminal of the line-card slice 20. The other electrical terminals of the cross-connect 40 may be connected to terminals of other line-card slices (not shown).

Also the electrical cross-connect 40 comprises switch terminals 30 for connecting of selected first electrical terminals 41 to selected second electrical terminals 42.

The interconnections between different switch terminals could be reconfigured manually or by a software command by using hardware integrated switches or cross-connects.

The line-card slices 10, 20 of FIG. 3 are adapted for use in bi-directional optical networks. Therefore line-card 10 comprises an additional transmitter 21' and line-card 20 comprises an additional receiver 11' with the corresponding converters 12', 22', respectively.

The use of an electrical cross-connect has various advantages over network elements with optical cross-connect, which require opto-optical switches and expensive individual fibre attachment to all ports of the OXC (optical cross-connect) chip. A network element having optical cross-connects require O/E/O conversion (opto-electrical-optical) on each side of the OXC chip. Furthermore the opto-optical switches (e.g. currently based on MEMS and bubble switch technologies) are expensive during fabrication.

Figure 4:
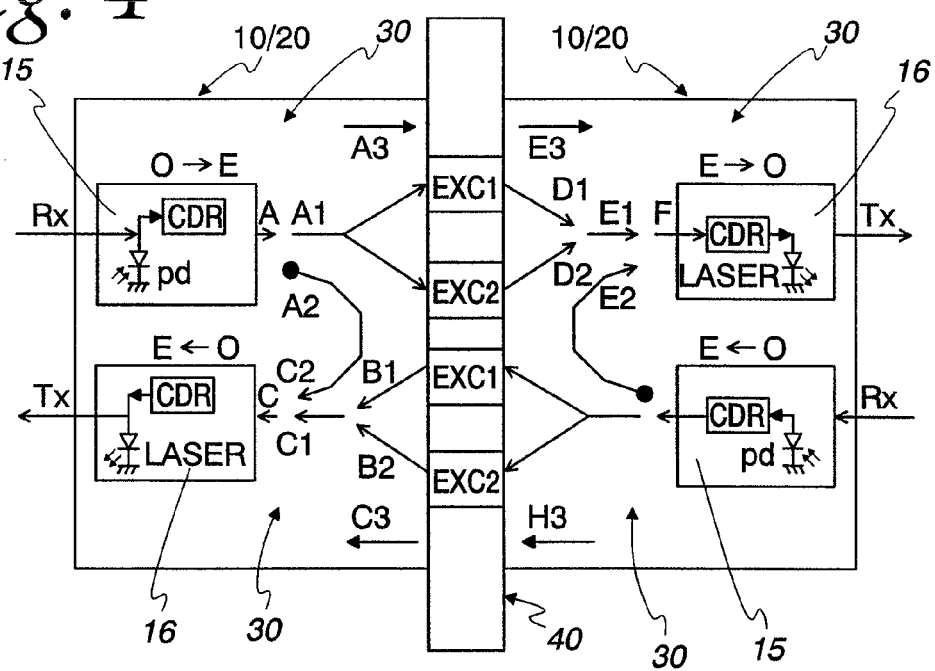
FIG. 4 shows in greater detail the functionality of the switch terminals on two line-card slices.

In FIG. 4 is shown the arrangement of switch terminals on line-card slices. Each of the both shown line-card slice may be a local or a remote line-card slice. Each line-card slice 10/20 comprises a device for receiving and a device for transmitting of optical signals. Each receiving device 15 comprises a receiver, an opto-electrical converter and an clock-and-data-recovery (CDR) circuitry. The CDR provides electronic regeneration of data signals as well as fault detection (data-rate and data-protocol independent) using bit-error-ratio, loss-of-clock and other suitable signals.

In the shown embodiment the receiver of the receiving device 15 is a photo diode.

As mentioned before, the CDR-chips in the line-card slices (local LLC and remote RLC) provide important information related to the quality of signal such as bit-error-ratio (BER) and loss-of-clock (LOC) that can be used for data-protocol independent fault detection and monitoring. However, all of the shown CDR-chips are optional.

Each transmitting device 16 of the shown embodiment comprises a CDR circuitry, an electro-optical converter and a transmitter. The CDR serves to eliminate jitter introduced by the cross-connects 40, which are electrically sandwiched between the receiving devices 15 and transmitting devices 16. The transmitter of the shown transmitting devices 16 is a laser diode.

The line-card slices 10, 20 are plugged into a back-plane (not shown). There are further provided two electrical cross-connects (EXC1, EXC2) 40, which are also plugged into the back-plane. The cross-connects 40 and the line-card slices 10, 20 are interconnected via the electrical transmission lines of the back-plane.

By means of the switch terminals 30 the electrical connection between various receiving devices and transmitting devices could be determined. In FIG. 4 the various switch terminals 30 are labelled as A, A1, A2, B1, B2, C, C1, C2, D1, D2, E1, E2, F. By using a software command the following connections in the shown embodiment can be made: A can be connected to A1 or A2, B1 or B2 can be connected to C1. C1 or C2 can be connected to C. D1 or D2 can be connected to E1. E1 or E2 can be connected to F.

If A is connected to A2, and C2 is connected to C, a so-called loop-back mode is provided. This might be very useful for trouble-shooting the hardware as well as the software.

If A is connected to A1, the signal is sent to both, EXC1 and EXC2. The switched outputs are available at D1 and D2. The signal from either EXC1 or EXC2 can be selected by connecting D1 or D2 to E1, respectively. This allows proceeding with the operation of the network element even if one of the cross-connects 40 (EXC1 or EXC2) fails. E1 or E2 could be connected to F depending on whether the output from the cross-connects 40 is used or the loop-back modes are used, respectively.

Furthermore, with the shown embodiment of the network element in FIG. 4 it is possible to realize a conventional line-card without using EXCs. If the shown line-card slices are plugged adjacently into the back-plane, e.g. in adjacent slots of the main chassis, and if A is connected to A3, with A3 being permanently connected to E3, and E3 is connected to F, and G is connected to H3, with H3 being permanently connected to C3, and C3 is connected to C the structure and functionality of a conventional line-card is readily realized.

Figure 5A:
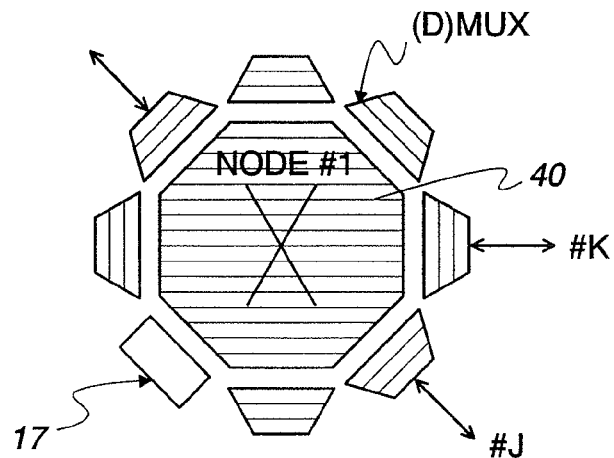
FIG. 5 shows the modular attachment of line-card slices to an electrical cross-connect.

FIG. 5 shows the modular attachment of line-card slices in a sandwich arrangement to electrical cross-connects. In FIG. 5a is shown a network element according to the present invention in a node #i. The shown network element comprises various line-card slices and filter-units arranged around a cross-connect 40. The line-card slices and filter-units are not shown in detail, but only the arrangement with respect to the cross-connect. There are shown fibre connections to various neighbour nodes, for example #k and #j. Node #i receives and transmits optical signals to each of the network nodes. The optical signals are received and demultiplexed (DMUX) by a line-card slice together with a filter-unit, respectively. Analogous the signals for transmitting are multiplexed (MUX) and transmitted by a line-card slice together with a filter-unit.

On one side (left side down) of the cross-connect 40 in FIG. 5a is shown a local or add/drop interface 17. By means of the interface 17 a user may add or drop signals in the node #i or he may control the signal traffic in node #i. Such a local add/drop interface 17 may also be plugged into the back-plane and connected to the electrical terminals thereof.

Figure 5B:
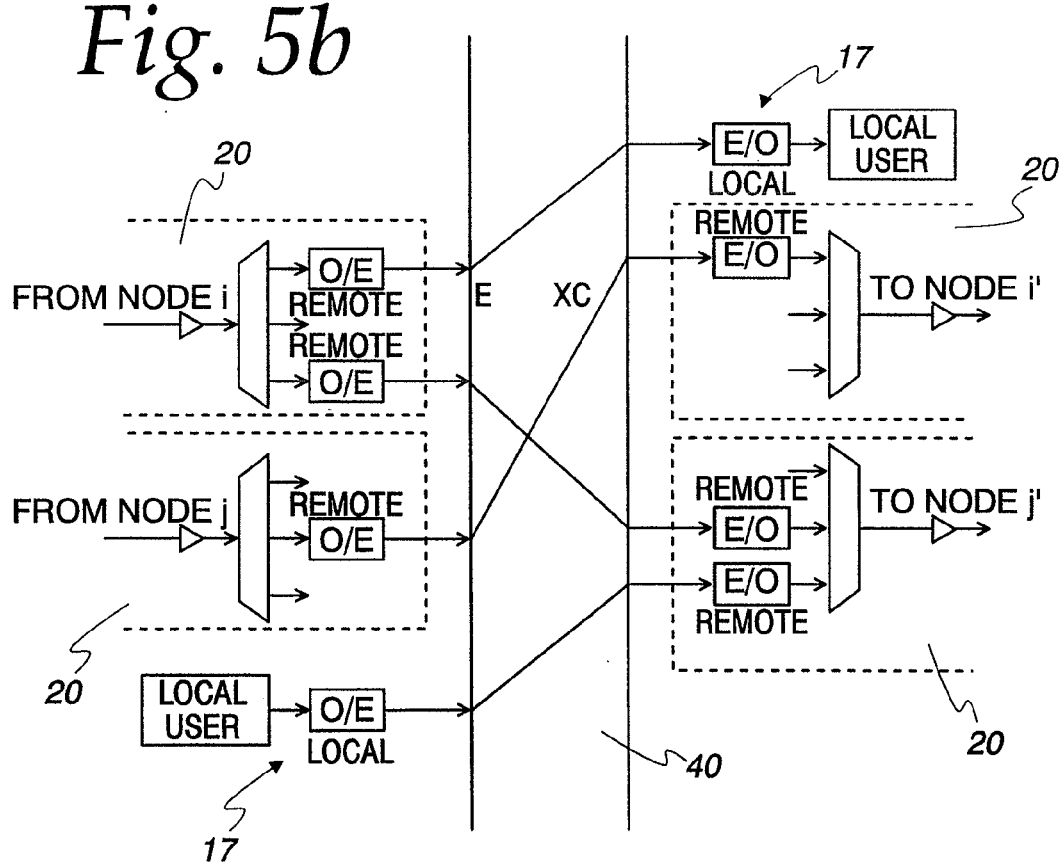

In FIG. 5b is shown another diagram of the electrically sandwiched arrangement of line-card slices and local add/drop interfaces 17 to an electrical cross-connect 40. All of the shown line-card slices may be considered as remote line-card slices 20, which receive signals from nodes i, j and transmit signals to nodes i', j'. On the local side of the shown network element there are arranged add/drop interfaces 17 for processing of the signals in the node by a user.

Survivability under the failure of a cross-connect is provided by using the option to plug-in a redundant cross-connect into the back-plane. The output electrical signals from the various line-card slices are connected to both (the original as well as the redundant) of the cross-connects. A given line-card slice selects either manually or automatically the best output from one of the two cross-connects.

In order to keep the costs at a low level a preferred embodiment of the network element according to the invention, for example in an embodiment as shown in FIG. 5, comprises distributed line-card slices and electrical cross-connects within a single chassis.

Figure 6A:
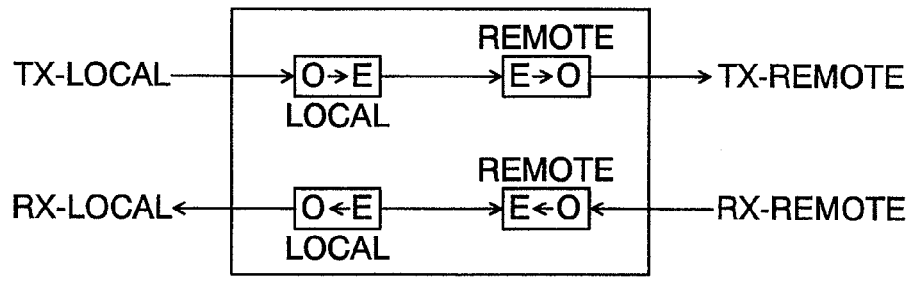
FIG. 6 shows the difference between the line-card slices according to the present invention and a prior art line-card architecture.

In FIG. 6 is shown the difference between a prior-art transmission line-card architecture and the distributed line-card slice arrangement according to the present invention. The architecture shown in FIG. 6a was created essentially for point-to-point networks where signals are always terminated at the two communicating nodes. In more flexible and efficient ring networks and certainly in case of mesh networks, the WDM signals often pass through various nodes before being finally terminated. In case of ring and more so in case of mesh networks the prior-art line-card architecture is quite limited in its functionality. For example, it does not allow WDM signals to pass through or be switched to other nodes. A pass-through signal requires two sets of remote (transmit and receive, Tx and Rx) interfaces. By using two of the prior-art line-cards one could achieve the pass-through functionality but not without incurring the extra cost of two sets of unused local interfaces. Moreover, in the prior-art, by using complicated interconnection of multiple extraneous switching elements the WDM signals can also be switched to a limited degree which may be adequate for certain primitive forms of WDM ring networks. Both of these techniques used to adapt the prior-art line-cards are very expensive, inflexible, and cumbersome to use in case of modern WDM networks. Such limitations also lead to the fragmentation of optical networking products whereby certain products can only be employed in certain network topologies and can support only certain data protocols. Such limitations prevent the widespread use of WDM and its penetration in cost-sensitive market segments.

Figure 6B:
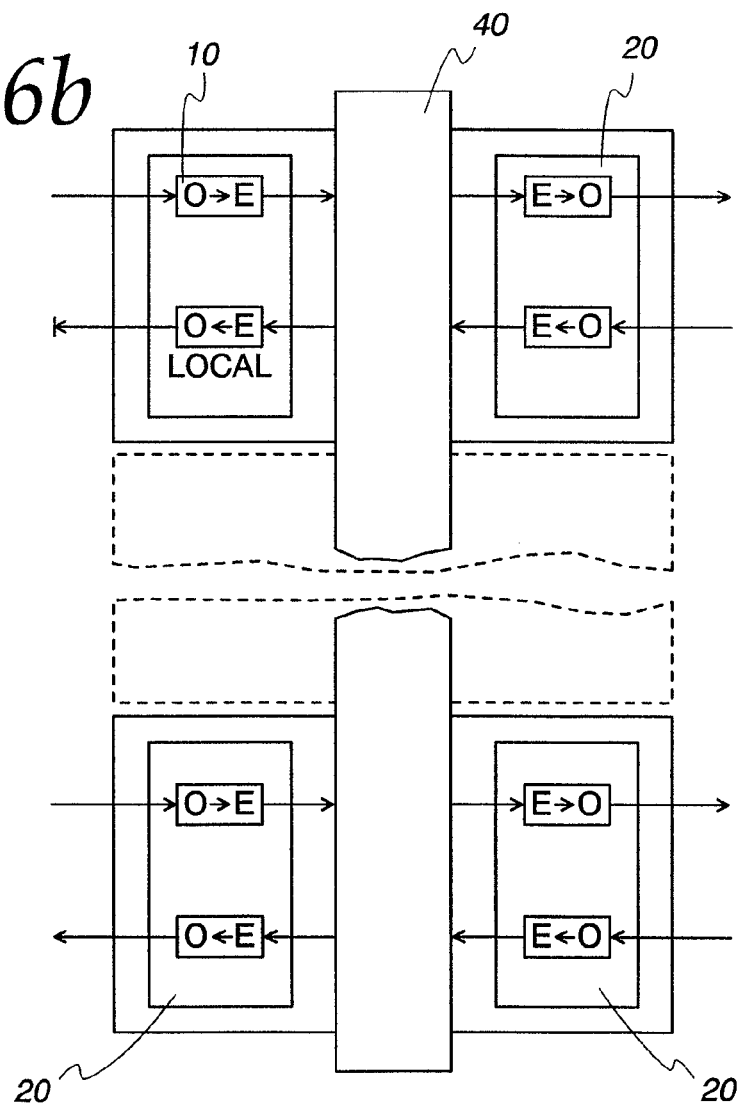

In FIG. 6b is shown the arrangement of line-card slices 10, 20 with respect to an electrical cross-connect 40 according to an embodiment of the present invention. However, due to the high flexibility of the network element according to the invention also the function of a prior-art line-card as shown in FIG. 6a which is essentially a repeater can be readily realized using the shown embodiment of FIG. 6b without using any cross-connect ports. Additional connections in the back-plane and software in the line-card slices allow the realization of a prior-art line-card simply by inserting of a local line-card slice and a remote line-card slice in adjacent slots in the line-card chassis and configuring them appropriately. Thus the network element according to the present invention is not only extremely flexible enabling creation of arbitrary point-to-point, ring and mesh networks but is also very cost-effective.

Figure 7A:
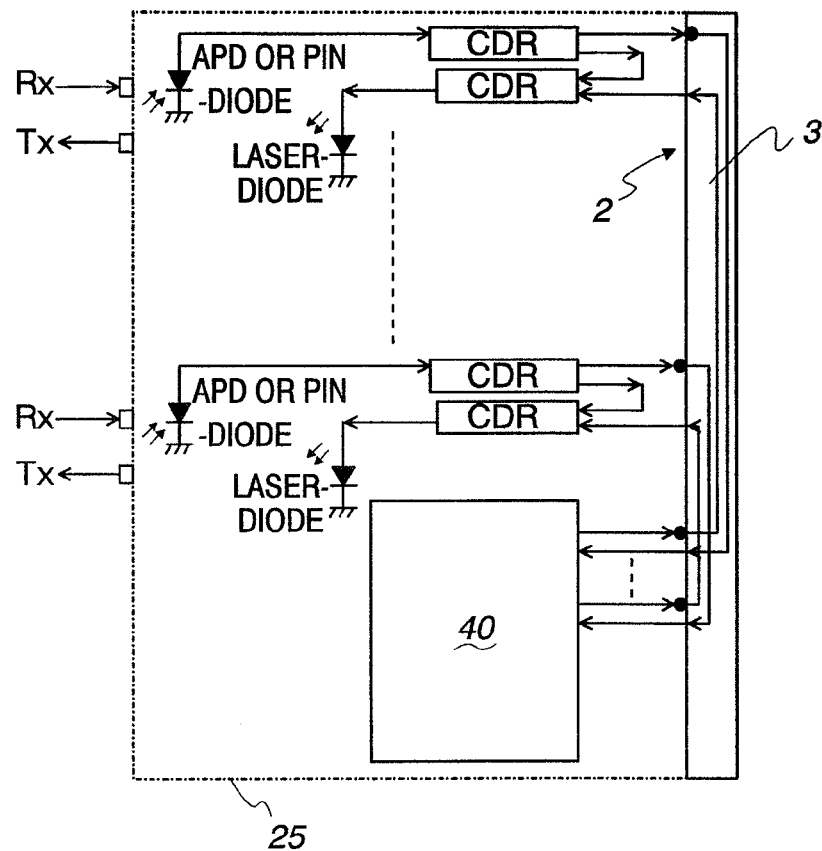
FIG. 7 shows the distributed arrangement of line-card slices and cross connects on a back-plane.

As shown in FIG. 7 the line-card slices comprise laser-based transmitters, PIN (P-intrinsic-N) and APD (avalanche photo diode) based receivers, respectively. A clock-and-data-recovery (CDR) provides regeneration of individual WDM channel signals. The line-card slices 10, 20 and the electrical cross-connect 40 are interconnected by very short high frequency (HF) transmission lines 3 running across the back-plane 2. The electrical cross-connect could be mounted in form of an electronic chip on a circuit-pack with high-speed connection terminated on a connector. The cross-connect circuit-pack when inserted into the chassis brings high-speed connection to the back-plane. Since the HF signals show large propagation losses over the back-plane the HF signal path lengths are kept as short as possible. Therefore it is advantageous to minimize the size of line-card slices as much as possible so as to fit a large number of them in close proximity with the electrical cross-connect 40.

In principle, mounting various electronic chips and optical components (used to implement line-card slices and cross-connects) on the back-plane can further reduce the hardware costs. That is more readily visualized as a single distributed line-card system 25 in FIG. 7a. However, in most cases it is desirable to put the line-card slices and individual cross-connect chips as separate pluggable units, which are then interconnected using the back-plane. The use of various pluggable cards enhances the reliability as the defective cards can be readily replaced without bringing down the whole network system.

Figure 7B:
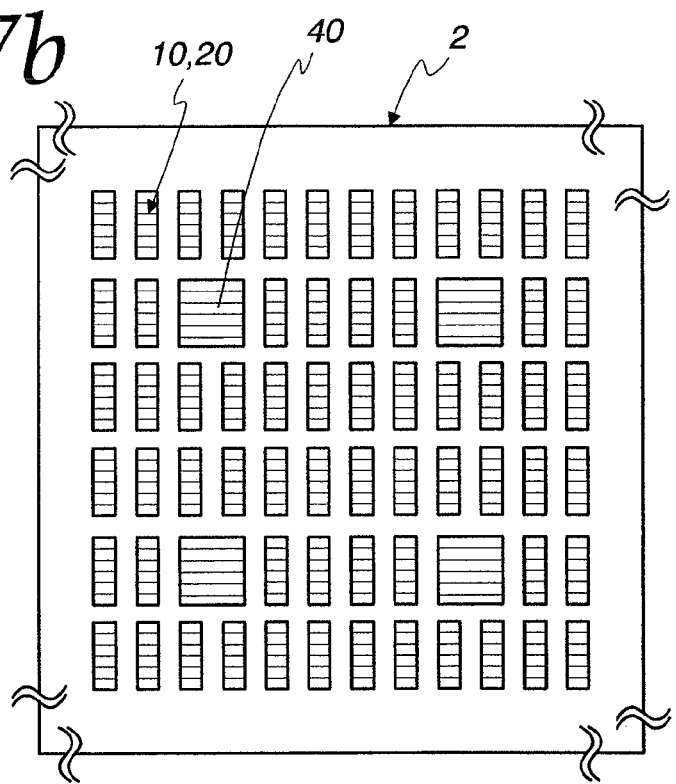

In FIG. 7b is shown a further view of the distributed arrangement of the line-card slices 10, 20 around various cross-connects 40 on a single back-plane 2.

Figure 9A:
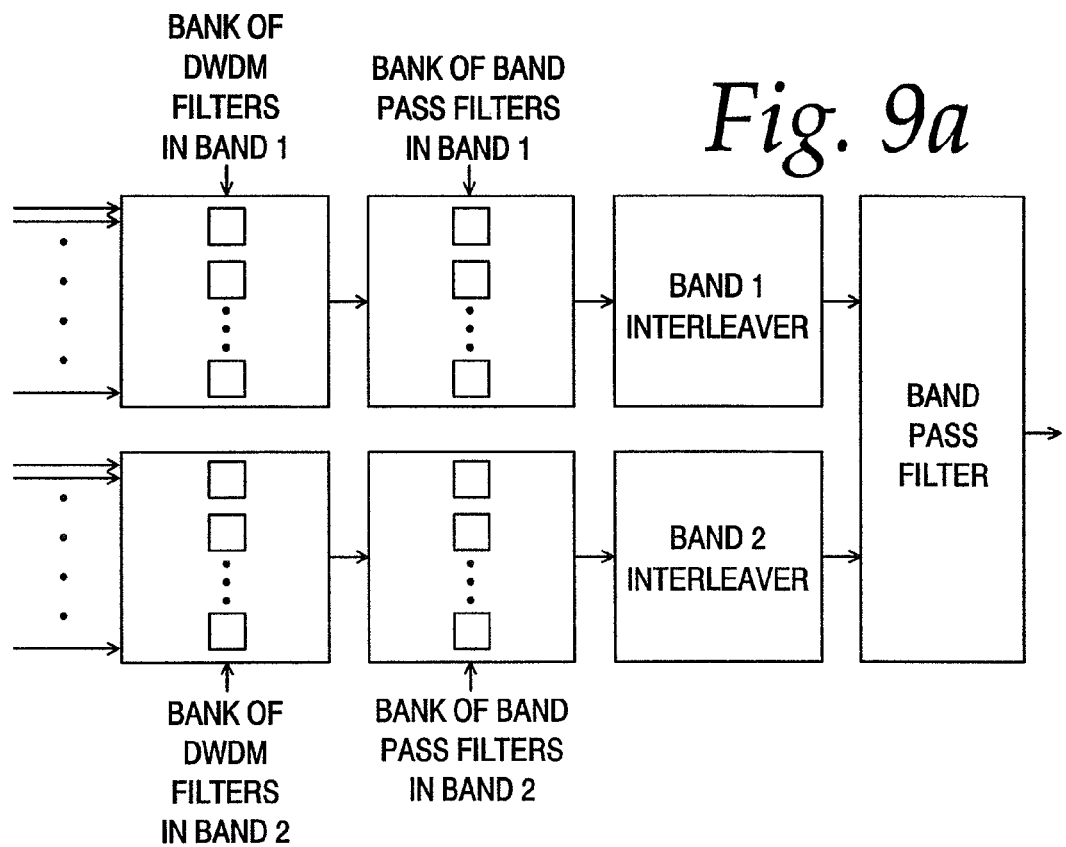
FIG. 9 shows different stages of a multiplexer of a preferred embodiment of a filter-unit.
Figure 9B:
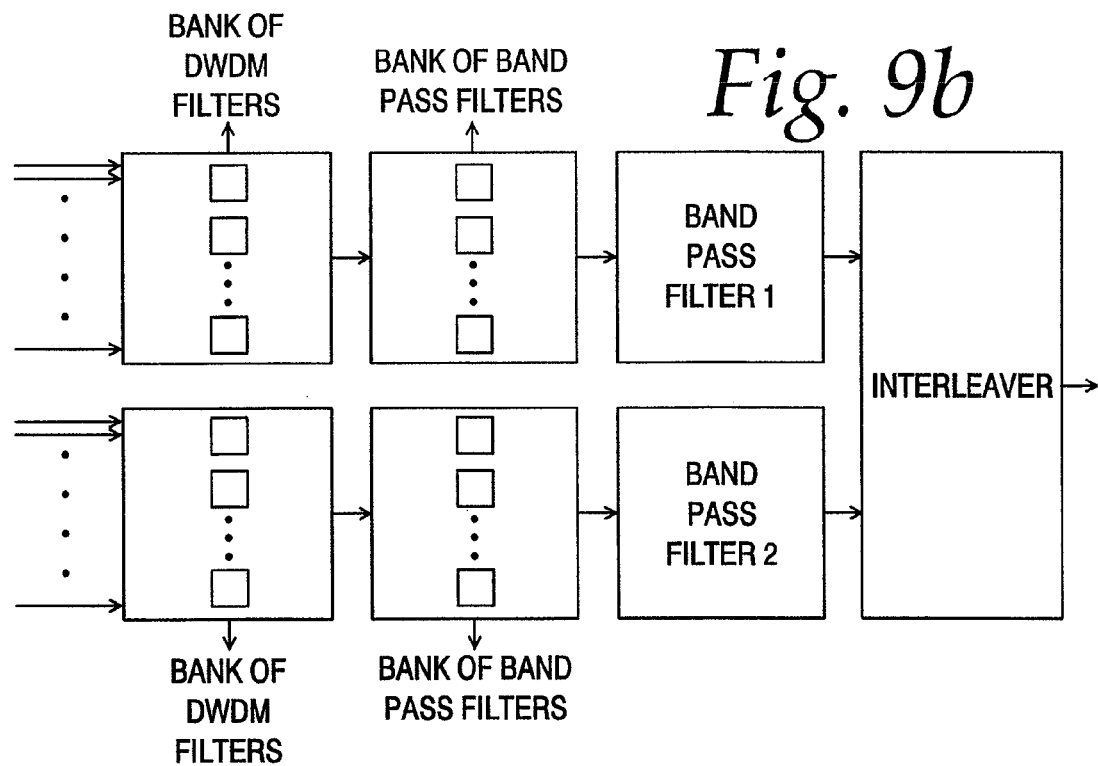

In FIGS. 8 and 9 are shown examples of modular filter-units, which could be inserted in an optical path of the network element according to the present invention. The filter-units serve for demultiplexing of the received optical signals and for multiplexing of the optical signals before transmitting them. Due to the modular structure of the filter-units highly scalable demultiplexers and multiplexers could be built up with respect to the demands of the individual network carrier.

Consider an N-channel equi-spaced multi-wavelength signal S with inter-channel separation of $\Delta\lambda$ and with a total optical bandwidth of $\Delta W$. It follows that $\Delta W=(N-1)\Delta\lambda$. By definition, a demultiplexer separates the multi-wavelength signal S into N individual wavelength signals and a multiplexer combines the N individual wavelength signals into the multi-wavelength signal S. As mentioned previously, for the metro/enterprise optical networks the ability to grow from low channel count to higher channel count without having to pay high start-up costs is crucial.

For the filter-units according to the present invention there are two different preferable designs to build up a modular, scalable and low cost N-channel demultiplexer using a multi-stage filter design (as shown in FIG. 8). A filter-unit with a N-channel multiplexer can be developed correspondingly, as shown in FIG. 9.

A filter stage comprises preferably either band-bass filters or interleavers or DWDM filters. A band-pass filter stage separates the input multi-wavelength signal into two or more wavelength bands, an interleaver stage separates the input multi-wavelength signal into odd- and even-numbered wavelengths, and a DWDM filter stage separates a band-pass multi-wavelength signal into individual wavelength channels which are modulated with user data for transmission.

In FIG. 8a is shown a first embodiment of a filter-unit with demultiplexer functionality. The first stage separates the input multi-wavelength optical signal S into two or more wavelength-bands of bandwidths $\Delta W$, $\Delta W2$, . . . such that $\Delta W=\Delta W1+\Delta W2+$. . . (only two wavelength-bands are drawn for simplicity). The second stage employs interleavers which separates the input signals $\Delta W1, \Delta W2$, . . . into odd- and even-numbered wavelengths, respectively. This increases the wavelength separation between individual channels from $\Delta\lambda$ to $2\Delta\lambda$. The third stage employs band-pass filters, which divide the input multi-wavelength signals of bandwidth $\Delta W1, \Delta W2$, . . . further into multi-wavelength signals of $\{\Delta W11, \Delta W12, \Delta W13, \ldots\}$, $\{\Delta W21, \Delta W22, \Delta W23, \ldots\}$, . . . respectively. Finally, the DWDM filters in the fourth stage separate the multi-wavelength signals $\Delta Wij$ into individual wavelength channels. For simplicity there is shown a four-stage filter design where the first and third stages employ band-pass filters. In general, depending on the application one could use a total of m number of such band-pass filter stages, where m≧1. Similarly, there is shown only one interleaver stage, namely the second stage that increases the inter-channel spacing from Δλ to 2Δλ. In general, one could employ n number of interleaver stages, which increases the inter-channel spacing from Δλ to (n+1) Δλ, where n≧1. The final DWDM filter stage could employ the p×1 filters, which separates a multi-wavelength signal into p individual number of channels, where p≧2 is the number of channels in the multi-wavelength input signal. Thus the total number of filter stages is FS=m+n+1. In general, the number of required filter stages increases and the total insertion loss increases with the number of wavelength channels. For example, FS=1 for N=4 but increases to FS=4 for N=72.

For the sake of simplicity and clarity there is shown an example with four filter stages (cf. FIG. 8). Since the number of filter-stages and filter-modules increase in proportion to the number of channels the present design is highly scalable and modular. The costs of the modular (de)multiplexer hardware increase only linearly with the number of channels combined with very low fixed or start-up costs. Assuming that all filter modules cost the same, the start-up costs are only 16% of a fully loaded system. For example, by combining the range of C-, L-, and S-bands in the 1550 nm spectral range, the designs as illustrated in FIGS. 8a and 8b could be used to provide a system with a total number of channels as few as 1 and as high as 160 with a very low fixed cost and a total cost which varies approximately linearly with the number of employed channels.

Note that no particular order of band-pass filter and interleaver stages is implied in the concept proposed here. For example (cf. FIGS. 8a and 8b), the order of band-pass filter and interleaver stages can be interchanged. In the filter configuration shown in FIG. 8b, the first stage uses interleaver(s) and the second stage uses the band-pass filters, instead of the band-pass filter and interleaver(s) in FIG. 8a, respectively. Both designs achieve the same functionality, namely, demultiplexing a multi-wavelength S signal into N individual channels. It is evident that many other variants of this design with a different number of stages and a different order of cascading of such stages are possible depending on the application.

A multiplexer which multiplexes N equi-spaced channels with inter-channel separation of Δλ into a single multi-wavelength signal S with a total optical bandwidth of ΔW can be built in exactly the same manner by reversing the direction of propagation of optical signals (cf. FIG. 9).

It should be noted that the multi-wavelength signals demultiplexed and multiplexed using the proposed hardware need not be equi-spaced. Depending on the total number of channels required, the wavelength spacing between the individual signals may be any multiple of Δλ, 2Δλ, 3Δλ, etc.

The modular structure with various stages of the filter-units allows to upgrade (and downgrade) the number of wavelength channels in-service without interruption to the services that use the existing wavelength channels.

Figure 10:
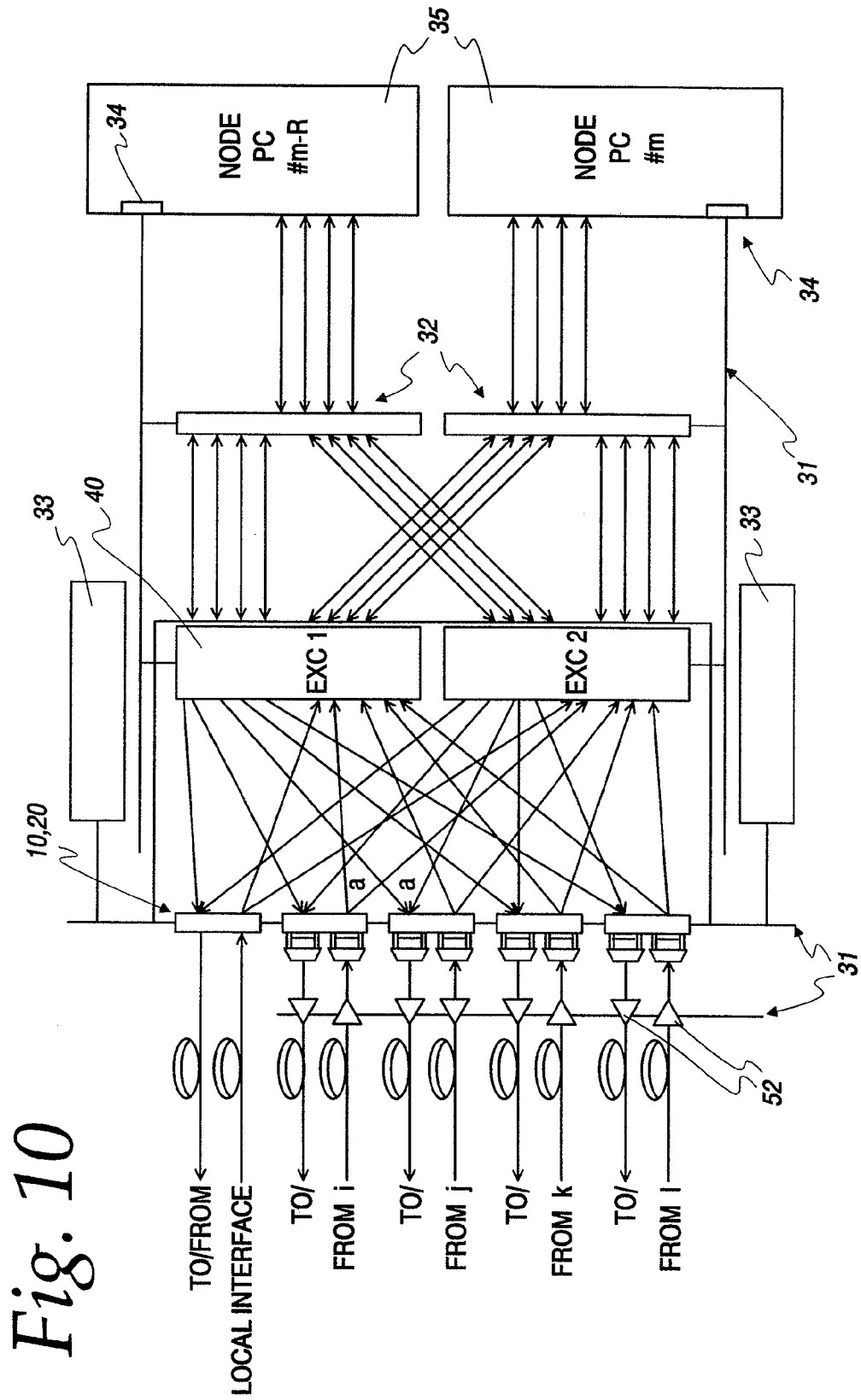
FIG. 10 shows a preferred embodiment of a network element architecture with redundant power supplies, cross-connects, node PCs, supervisory card(s), line-card slices, filter-units, etc.

In FIG. 10 is shown a further preferred embodiment of a network element according to the present invention. The architecture of the network element is scalable to arbitrary number of nearest neighbours. The network element of each node can add/drop signals to/from an arbitrary number of adjacent nodes. For simplicity of drawing, only four adjacent nodes i, j, k, l are shown. As shown in FIG. 10, the received and transmitted multi-wavelength signals can be amplified using an optical amplifier 52, e.g. using EDFAs (erbium-doped-fibre-amplifier) if required by the user. The signals are (de)multiplexed using the multi-stage filters discussed above. An out-of-band supervisory channel can be implemented either by using one of the wavelengths (on ITU grid)on each link to carry supervisory signal if required, or a 1510 nm signal (outside the EDFA amplifier range) can be used to implement supervisory channel (cf. FIG. 11a). Alternatively, an in-band supervisory channel can be implemented using electrical (de)multiplexer (cf. FIG. 11c) which can be done using special purpose chips implementing bit or byte processors. The electrical (de)multiplexer could employ time or frequency domain techniques. As an example, an in-band supervisory channel could be implemented by (de)multiplexing data from/into the DCC (data communication channel) channel when SONET/SDH protocol is used.

For implementing of the supervisory channel each node in the shown embodiment comprises one or more distributed line-card slices 10,20 and a single EXC1 (electrical cross-connect) or (redundant) EXC2 (reference 40). The multi-wavelength user signal from each of the adjacent nodes j is first optically demultiplexed and then terminated onto the distributed line-card slice. Similarly, several optical signals originating from the distributed line-card slice(s) are multiplexed into a multi-wavelength signal and then amplified (if required) before transmission. The node PC (personal computer) 35 (through an appropriate plug-in card) provides an electrical out-of-band supervisory signal, which is connected to the supervisory card (SC) 32. The supervisory signals terminated at SC cards 32 are connected to suitable default RLC (remote line-card) slices 20 using back-plane connections. However, in case of fault the supervisory signal can be switched to an alternate RLC slice 20 using the cross-connects EXC1 or EXC2. The supervisory card provides interfaces for multiple supervisory signals from/to various nodes to the node controller PC of the said node. The various cards communicate with each other using an internal communication bus 31, which could use a proprietary protocol or standard protocols such as Ethernet, CAN, etc. The use of a bus card (BC) 34 in the node controller PC facilitates this process. A redundant power supply 33 is also provided if required. Note that the line-card slices and filter cards are typically plugged into the line-card chassis (LCC) and filter card chassis (FCC), respectively. However, the LCC is designed in such a way that filter cards can also be plugged in if and when necessary. Due to its form factor a filter card in a very simple embodiment replaces two line-card slices. This helps eliminate the filter-chassis when only a small number of line-card slices are required to build the network. The design according to the present invention is therefore also highly scalable in terms of the redundancy required by user. This is very important because the users have different requirements on redundancy depending on their cost-budgets. In general the system costs increase with the required redundancy. A minimum configuration for some users may simply be the line-card chassis, a single power supply, and various LLC and RLC slices. For users who need more features and more reliability may use additional hardware as follows: 1 PC+1 SC+1 BC+1 XC. The user can also configure his system by using the proposed hardware to achieve card protection (see for example FIG. 14) and/or device protection (see for example FIG. 15), respectively. For a minimum system configuration which includes 1 PC+1 SC+1 BC+1 XC, the link failure recovery is implemented using mesh restoration techniques. Protection in case of failure in a local system (consisting of various chassis) at one site (partial node failure) can be overcome by using an additional redundant system—also called device protection (cf. FIG. 12). Partial failure (such as isolated cards) in a local system can be overcome by using card protection scheme as shown in FIG. 13.

Figure 12:
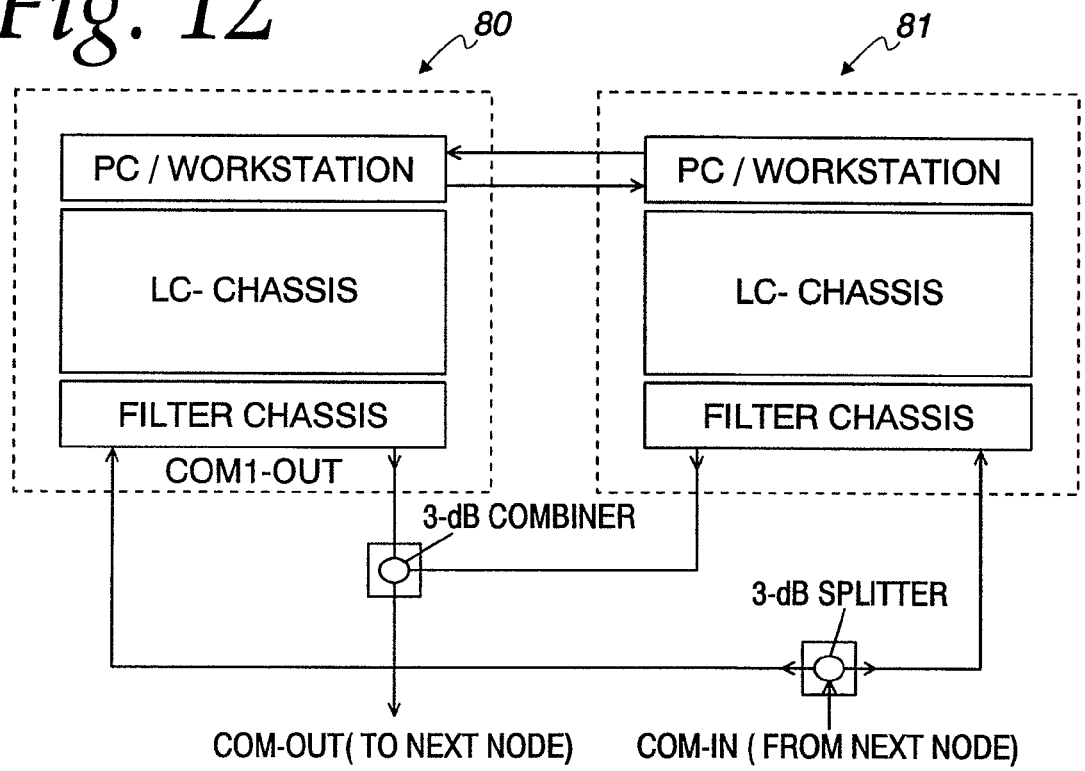
FIG. 12 shows a configuration of a network element with device protection.
Figure 13:
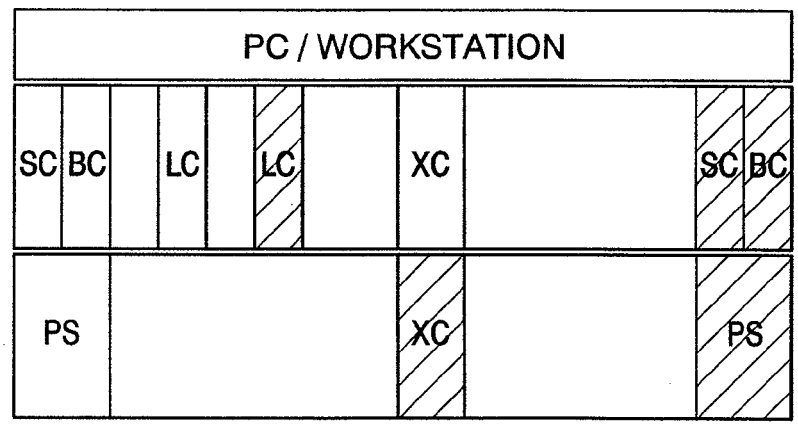
FIG. 13 shows a configuration of a network element with card protection.

FIGS. 12 and 13 show the difference between device protection and card protection. If the network element according to the present invention is configured with card protection than, as shown in the example, various modules or cards are redundant. In the shown example of FIG. 13 the line-card slice LC, the cross-connect XC, the bus card BC, the power supply PS and the supervisory card SC are redundant.

In FIG. 12 is shown how device protection can be achieved by using a working device 80 and a stand-by device 81 with the same components, which are realized according to a preferred embodiment of the present invention.

Figure 14:
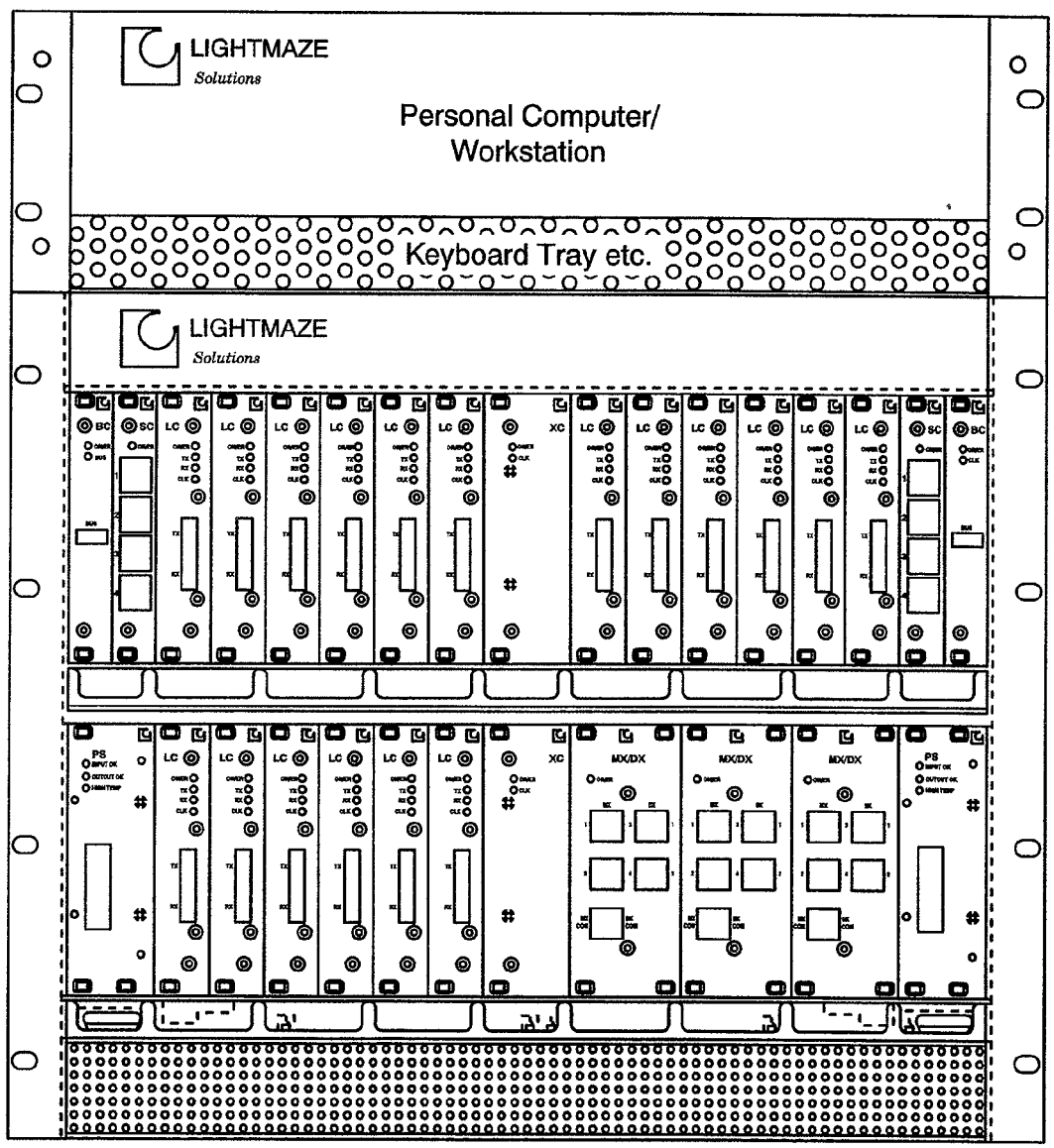
FIG. 14 shows an embodiment of the network element in a single hardware unit.

An example of a hardware unit of an embodiment of the network element according to the present invention is shown in FIG. 14. The hardware unit comprises a main chassis, filter-card chassis, and a PC chassis. The shown main chassis could receive up to 24 line-card slices, two 32×32 E-CXs, 1 or more filter-plug in units, two bus-cards, two-supervisory cards, and two power supplies. If the main chassis comprises of all the above plug-in units except filter-cards, it is defined as line-card chassis. In other words both the main chassis and line-card chassis are designed to receive line-card slices and might, therefore, both be called line-card chassis in this application. The shown PC comprises several plug in cards. Examples of plug-in cards are one or more ethernet cards and bus cards.

Figure 11A:
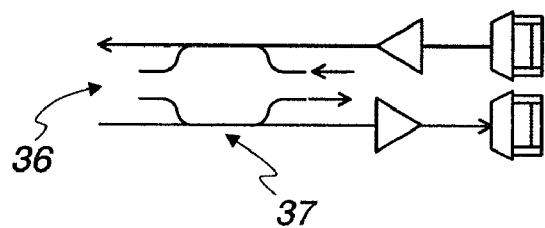
FIG. 11 shows the implementation of supervisory channels in a network element.
Figure 11B:
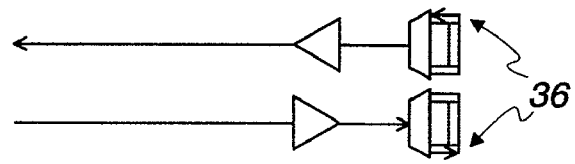
Figure 11C:
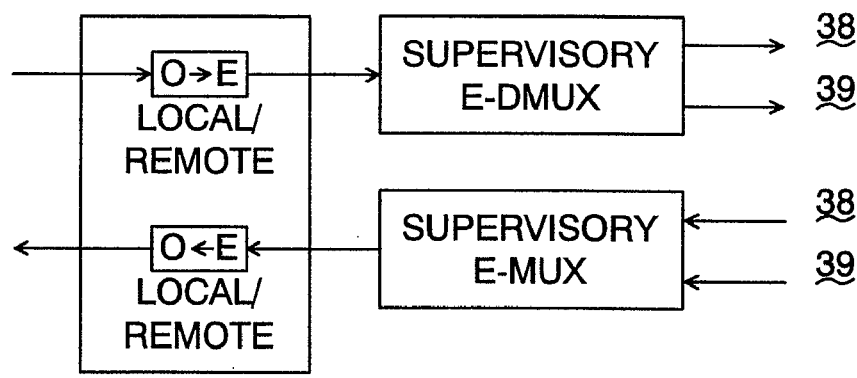

In FIG. 11 is shown the supervisory channel multiplexing and demultiplexing in the optical domain (FIG. 11*a* and FIG. 11*b*) and the electrical domain (FIG. 11*c*), respectively. In FIG. 11*a* an optical signal in the 1510 nm wavelength range (outside the EDFA range) is used to implement the supervisory channel. The supervisory channel (reference 36) in FIG. 11*a* is coupled into and out of the fibre carrying the multi-wavelength optical signal by using a WDM coupler (reference 37). Alternatively, the supervisory channel (reference 36) in FIG. 11*b* is coupled into and out of the fibre carrying the multi-wavelength input signal by using DWDM (de)multiplexer realized using filter-units as described earlier in this document. In FIG. 11*b* the signals of the supervisory channel (reference 36) are carried over one of the standard DWDM wavelengths based on ITU grid.

In FIG. 11*c* the received signal, which might comprise supervisory and/or other data, is first converted from optical to electrical domain in a line-card slice and electrically demultiplexed to a supervisory signal 38 and a user signal 39. Before transmitting the supervisory signal 38 and the user signal 39 are electrically multiplexed and converted from electrical to optical domain in an electro-optical converter.

With reference to FIG. 15 a supervisory channel and sub-system is used to manage the entire optical network. The supervisory channel can be used to manage the network using existing standards such as SNMP (simple network management protocol) or proprietary protocols. The supervisory channel enables a bi-directional logical connection between any pair of nodes over redundant paths. This ensures that the supervisory communication connection between any pair of nodes will survive under the single failure assumption involving failure of any single link or a single node except for the two communicating nodes themselves. For example, Z1 and Z2 may represent a node pair. The logical connection between Z1 and Z2 is established through two or more node-link-disjoint paths, e.g. Z1⇔Z2, Z1⇔V⇔Z3, and Z1⇔X⇔Y⇔Z2, etc. The number of node-link-disjoint paths available depends on the actual topology of the optical network. If more than two node-link-disjoint paths are used between the communicating nodes, survivability of supervisory channel against multiple failures can be achieved. Further, a single physical supervisory channel between two nodes say X and Y could be used to establish multiple logical connections, which may be routed over that link. For example, can be U⇔Z1⇔X⇔Y and U⇔V⇔Z2⇔Y the two node-link-disjoint paths used as supervisory data paths between nodes U and Y. The same physical supervisory channel over the link X⇔Y using whether in-band or out-of band signalling or any other arrangement could be used to establish a logical supervisory connection between both S1: Z1⇔Z2 and S2: U⇔Y, where S1 and S2 are the respective supervisory logical communication channels. In order to achieve this the supervisory signals for different logical channels are multiplexed, demultiplexed, and routed through a particular node. The multiplexing and demultiplexing can be done in time or wavelength domain. In time domain the multiplexing and demultiplexing could be based on either time division and/or frequency division and/or statistical and/or other forms of (de)multiplexing techniques. Thus each node acts like a multiplexer, demultiplexer, router/switch/cross-connect, sender, and receiver for arbitrary number of supervisory messages, which may pass-through it or originate/terminate at it.

In FIG. 15*a* is shown the redundant supervisory channel routing for robustness and in FIG. 15*b* is shown supervisory connectivity achieved for arbitrary number of adjacent nodes using time-division multiplexing or statistical multiplexing by using a single wavelength channel over each link.

Figure 16:
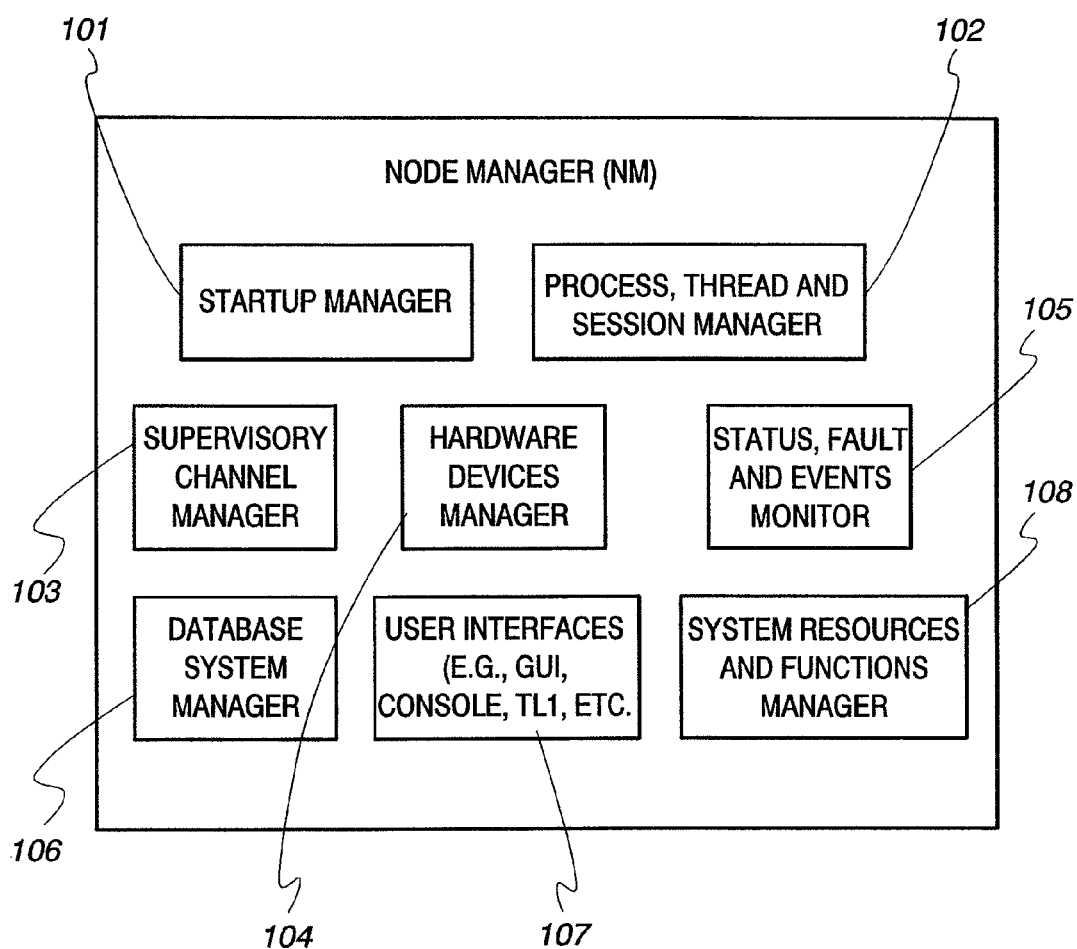
FIG. 16 shows a preferred embodiment of node software architecture for use in a network element.

With reference to FIG. 16 a node software architecture is shown, which could preferably be implemented in a network element in one embodiment of the present invention. The node software architecture is an intelligent optical networking architecture and applicable to arbitrary network topology. In particular, it unifies point-to-point, ring, and mesh architectures and is also scalable, affordable, robust, and reliable. Intelligence refers among other things to how information related to various aspects of network configuration, operation, and management is stored in the network. Information refers to any details related to state of network elements, state of the network, various primary and redundant paths through the network, configuration data, and any other data which is pertinent to the optical network management system, etc. All information can be a) stored at a single node, b) duplicated over several or all network nodes, or c) distributed over several or all network nodes. The distributed approach c) scales well as the number of nodes increases because any single node needs to deal with a reduced amount of information. But a software overhead penalty must be paid because the various pieces of information must be obtained from various nodes and inconsistencies between any duplicated information must be resolved. An alternative is to store all the information at a single node (approach a), which can be accessed by any user at any of the network nodes, or a user located elsewhere such as one or more management offices. However, if this node fails all the valuable data is lost. In order to solve this problem, the same data can be stored at several or all network nodes (approach b). In case one of the network node fails, the data can then be retrieved from one of the several other nodes. The second aspect of intelligence involves who takes the required management actions. A management action involves performing a set of tasks and can be carried out in a centralized, distributed, or hybrid manner. The various tasks can in turn also be performed in a centralized or distributed manner. In the centralized approach one or more software agents residing at various nodes carry out a single task. A software agent is a software process or an execution thread, which is used to implement certain software functionality. Some of the examples of software agents as shown in the figure are start-up manager 101, process, thread, and sessions manager 102, supervisory channel process manager 103, hardware devices manager 104, status, fault, and events manager 105, database system manager 106, user interfaces (e.g. GUI, console, TL1, etc.) 107, System Resources and Functions Manager 108.

In the distributed approach one or more software agents residing at various nodes preferably carry out a single task. A management action is said to be carried out in centralized mode if all of the tasks it is comprised of are carried out in a centralized manner. A management action is said to be carried out in distributed mode if all of the tasks it is comprised of are carried out in a distributed manner. A management action is said to be carried out in hybrid mode if one or more of the tasks it is comprised of are carried out in a centralized manner while the others are carried out in the distributed manner. For example, in case of a fault in the optical network the management action may involve the following tasks: 1. fault detection/isolation, 2. fault signalling to the network management system (which itself may be centralized, distributed, or hybrid), 3. alternate path calculation and allocation, 4. signalling for restoration activation, 5. optical signal switching at various nodes, 6. updating various databases and reclaiming the system resources, 7. restoring the failed hardware or software. Each of these tasks can be carried out using a software agent located at a single node or several nodes. Thus this management action can be completed using a centralized, distributed, or hybrid approach.

The invention claimed is:

1. Intelligent network element for optical networks, comprising:
   at least one back-plane including:
   a plurality of electrical transmission lines running across the back-plane; and,
   a plurality of electrical terminals connected to the transmission lines;
   a plurality of line-card slices having:
   electrical terminals,
   wherein each line-card slice is attached to the back-plane directly or in the form of a plug-in module such that the electrical terminals of the line-card slice are electrically connected to selected ones of the terminals of the back-plane such that the electrical terminals of various line-card slices are interconnected, allowing the various line card slices to communicate with each other via the electrical transmission lines in the back plane,
   with at least one of the line-card slices comprising:
   at least one optical receiver for receiving optical signals from the network, and
   at least one opto-electrical converter integrated in or optically connected to the optical receiver with electrical terminals, and
   at least one of the line-card slices comprising:
   at least one optical transmitter for transmitting optical signals to the network, and
   at least one electro-optical converter integrated in or optically connected to the optical transmitter with electrical terminals;
   wherein various of the electrical terminals of the back-plane or the line-card slices or both are implemented as switch terminals that provide selected and reconfigurable electrical interconnections among various of the at least one receiver, transmitter and converter from one single line-card slice or from different ones of the line-card slices using electrical switches or at least one electrical cross-connect wherein said intelligent network element provides for optical networks with arbitrary topology.

2. Network element according to claim 1, wherein the switch terminals are provided on the line-card slices so that the electrical terminals of the converters are electrically connectable to one or more of selected electrical terminals of the line-card slices to achieve a selected electrical interconnection via the transmission lines in the back-plane or to one or more of the electrical terminals of a further converter of the same line-card slice to achieve a loop-back mode of operation.

3. Network element according to claim 1, wherein the switch terminals are switchable by a software command.

4. Network element according to claim 1, wherein at least one electrical cross-connect is provided having first electrical terminals for receiving of electrical signals and second electrical terminals for transmitting electrical signals, the cross-connect directing electrical signals from selected first to selected second electrical terminals;
   whereby the cross-connect is plugged into the back-plane with the electrical terminals electrically connected to the electrical terminals of the back-plane such that the first electrical terminals are electrically connected via the electrical transmission lines of the back-plane to the electrical terminals of selected first of the line-card slices and the second electrical terminals are electrically connected via the electrical transmission lines of the back-plane to the electrical terminals of selected second of the line-card slices.

5. Network element according to claim 4, wherein the line-card slices and the at least one cross-connect are distributed on the back-plane in such a way, that each cross-connect is electrically sandwiched between a predetermined number of the selected first and second of the line-card slices.

6. Network element according to claim 1, wherein each line-card slice comprises an optical transmitter and an optical receiver with the corresponding converters.

7. Network element according to claim 1, wherein the network element is a Dense-Wavelength-Division-Multiplexed network element and comprises at least one filter-unit for transforming of the optical multi-wavelength signals into individual wavelength channel signals and vice versa, whereby the filter-unit is disposed in at least one optical path between an optical terminal of the network element and a receiver or transmitter of a line-card slice.

8. Network element according to claim 7, wherein the filter-unit is implemented in one or more filter-cards, which are pluggable into the back-plane.

9. Network element according to claim 1, wherein at least one line-card chassis for plugging in of a single or a group of line-card slices is attached to the back-plane.

10. Network element according to claim 1, wherein at least one filter-card chassis for plugging in of a single or a group of filter-cards is attached to the back-plane.

11. Network element according to claim 9, wherein the line-card chassis is adapted such that a line-card slice or a filter-card can be plugged in.

12. Network element according to claim 7, wherein the filter-unit comprises a modular structure with various stages, each stage comprising at least one of the following devices:

band-pass-filter;
interleaver;
DWDM filter.

13. Network element according to claim 8, wherein the filter-cards are adapted and attached to the back-plane such that they could be electrically managed via the back-plane.

14. Network element according to claim 1, wherein a supervisory system is provided.

15. Network element according to claim 14, wherein the network element comprises at least one supervisory card attached to the back-plane, wherein the at least one supervisory card could be provided with a second supervisory card to provide redundancy.

16. Network element according to claim 1, wherein the network element comprises at least one bus card, especially a single or redundant internal bus card, attached to the back-plane.

17. Network element according to claim 15, wherein the network element comprises single or redundant node controller personal computers that communicate with the external optical network and the various devices of the network element through the supervisory cards and the internal bus cards.

18. Network element according to claim 1, wherein the network element comprises a single back-plane.

19. Network element according to claim 1, wherein the network element comprises single or redundant power supplies attached to the back-plane.

20. Network element according to claim 1, wherein the network element is adapted to provide device or card protection or both in optical networks.

21. Network element according to claim 1, wherein the network element is adapted to be locally or remotely managed by providing an SNMP agent or other software agent interfaces.

22. Network element according to claim 1, wherein the network element is provided an optical amplifier capable of amplifying the received and transmitted single or multi-wavelength signals attached to the back-plane directly or in the form of plug-in module such that it can be managed under the intelligence of software control.

23. Network element according to claim 22, wherein the optical amplifier is provided as one or more optical amplifier cards that can be plugged into the back-plane.

* * * * *

UNITED STATES PATENT AND TRADEMARK OFFICE
CERTIFICATE OF CORRECTION

| | |
|---|---|
| PATENT NO. | : 7,123,806 B2 |
| APPLICATION NO. | : 10/401176 |
| DATED | : October 17, 2006 |
| INVENTOR(S) | : Elke Jahn et al. |

Page 1 of 1

It is certified that error appears in the above-identified patent and that said Letters Patent is hereby corrected as shown below:

On the Title Page Item (73)
Assignee reads "Molex Holding GmbH", should read --LIGHTMAZE SOLUTIONS AG--

Signed and Sealed this

Ninth Day of September, 2008

JON W. DUDAS
*Director of the United States Patent and Trademark Office*